(12) United States Patent
Long et al.

(10) Patent No.: US 11,097,327 B2
(45) Date of Patent: Aug. 24, 2021

(54) BENDING MACHINE

(71) Applicant: OMS MACHINERY CO., LTD., Guangdong (CN)

(72) Inventors: Xiaobin Long, Zhongshan (CN); Haifeng Hu, Zhongshan (CN); Chuan Long, Zhongshan (CN); Yang Shi, Zhongshan (CN)

(73) Assignee: OMS MACHINERY CO., LTD., Zhongshan (CN)

( * ) Notice: Subject to any disclaimer, the term of this patent is extended or adjusted under 35 U.S.C. 154(b) by 296 days.

(21) Appl. No.: 16/317,021

(22) PCT Filed: Nov. 30, 2017

(86) PCT No.: PCT/CN2017/113735
§ 371 (c)(1),
(2) Date: Jan. 10, 2019

(87) PCT Pub. No.: WO2019/015203
PCT Pub. Date: Jan. 24, 2019

(65) Prior Publication Data
US 2020/0353521 A1   Nov. 12, 2020

(30) Foreign Application Priority Data

Jul. 19, 2017 (CN) .......................... 201710590416.7

(51) Int. Cl.
*B21D 5/06* (2006.01)
*B21D 37/10* (2006.01)
*B21D 43/00* (2006.01)

(52) U.S. Cl.
CPC ............... *B21D 5/06* (2013.01); *B21D 37/10* (2013.01); *B21D 43/003* (2013.01)

(58) Field of Classification Search
CPC . B21D 5/06; B21D 5/04; B21D 5/045; B21D 5/047; B21D 5/16; B21D 5/00;
(Continued)

(56) References Cited

U.S. PATENT DOCUMENTS

| 6,196,041 B1 | 3/2001 | Codatto et al. |
| 9,314,829 B2 | 4/2016 | Kunze et al. |

(Continued)

FOREIGN PATENT DOCUMENTS

| CN | 201493367 U | * 6/2010 | ............. B30B 15/04 |
| CN | 103658252 A | 3/2014 | |

(Continued)

OTHER PUBLICATIONS

Apr. 26, 2018 International Search Report issued in International Patent Application No. PCT/CN2017/113735.
(Continued)

*Primary Examiner* — Shelley M Self
*Assistant Examiner* — Kevin E O'Brien
(74) *Attorney, Agent, or Firm* — Oliff PLC

(57) ABSTRACT

A bending machine including a rack, the rack is provided with a feeding mechanism, one side of the feeding mechanism is provided with a pressing mechanism capable of pressing a workpiece firmly, and one side of the pressing mechanism is provided with a bending mechanism capable of bending the workpiece inside the bending mechanism. The bending machine is simple in structure, high in production and capable of reducing labor cost.

7 Claims, 12 Drawing Sheets

(58) Field of Classification Search
CPC ........ B21D 11/20; B21D 11/22; B21D 39/02;
B21D 39/021; B21D 37/10; B21D
43/003; B21D 5/042; B21D 5/0218;
B21D 5/0236; B21D 5/0254; B21D
5/0209; B30B 15/026; B30B 15/028;
B30B 15/02
See application file for complete search history.

(56) References Cited

U.S. PATENT DOCUMENTS

2008/0216545 A1   9/2008  Codatto et al.
2014/0090442 A1   4/2014  Kunze et al.

FOREIGN PATENT DOCUMENTS

| CN | 106180302 A | | 12/2016 | |
|---|---|---|---|---|
| CN | 206065118 U | * | 4/2017 | |
| CN | 206065118 U | | 4/2017 | |
| CN | 206305238 U | | 7/2017 | |
| CN | 107262563 A | | 10/2017 | |
| EP | 1 797 973 A1 | | 6/2007 | |
| JP | 63207419 A | * | 8/1988 | ........... B21D 5/0218 |
| JP | H08-164422 A | | 6/1996 | |

OTHER PUBLICATIONS

Apr. 26, 2018 Written Opinion of the International Searching Authority issued in International Patent Application No. PCT/CN2017/113735.

\* cited by examiner

BENDING MACHINE

TECHNICAL FIELD

The present invention relates to a bending machine.

BACKGROUND ART

At present, metal plate process such as metal plate bending generally exists in the production of products. For example, in the production of products such as a chassis and an electric box, metal plates need to be bent by a bending machine. However, there are the following disadvantages for the traditional bending machines:
1. The structure is relatively complex, feeding is completed manually, and the metal plates need to be hand-fed into a bending mechanism by workers, so that the labor intensity of the worker is high, and the work efficiency is low;
2. Edge-bending and pressing actions of the traditional bending machine are performed by a pressure plate driven by a hydraulic mechanism or a high-power motor by virtue of a speed reducing mechanism, and therefore, the traditional bending machine is relatively complex in structure, inconvenient to maintain, large in space taken up and high in production cost due to high power and energy consumption of the hydraulic mechanism or the driving motor.
3. The metal plate may only be bent into a fixed angle by a bending part during the metal plate bending, and different bending dies need to be replaced if a plurality of different bending angles are formed on the same metal plate, therefore, the production efficiency is low, and the production cost is high; and
4. The width of a pressing die of the traditional bending machine is fixed, if each edge of the metal plate is bent and pressed, the original edge-bent part may be pressed again so as to be damaged. However, according to a traditional processing technology, after one edge bent and pressed, the workpiece is processed by another bending machine with a pressing die of which the width is relatively small. The traditional processing is complex, the production efficiency is low. Thus the present invention has been made based on the above defects.

SUMMARY OF THE INVENTION

The present invention aims at providing a bending machine simple in structure, high in production efficiency and capable of reducing labor cost, overcoming the defects in the prior art.

The present invention is implemented according to the following technical solutions:

A bending machine, comprising: a rack 1, the rack 1 is provided with a feeding mechanism 2, one side of the feeding mechanism 2 is provided with a pressing mechanism 3 capable of pressing a workpiece 100 firmly, and one side of the pressing mechanism 3 is provided with a bending mechanism 4 capable of bending the workpiece 100 inside the bending mechanism 4.

In the bending machine, the pressing mechanism 3 comprises a lower die table/tables 31 arranged on the rack 1, an upper pressing die 32 is/upper pressing dies 32 are arranged above the lower die table/tables 31 respectively, the rack 1 is provided with an upper pressing die driving mechanism 33 driving the upper pressing die/dies 32 to ascend and descend relative to the rack 1, the upper pressing die driving mechanism 33 comprises a slide block 331 capable of sliding up and down relative to the rack 1, a pressure plate 332 is arranged below the slide block 331, each upper pressing die 32 is connected to the pressure plate 332, a first connecting rod mechanism 333 driving the pressure plate 332 to move up and down when the slide block 331 moves up and down is arranged between the slide block 331 and the pressure plate 332, the first connecting rod mechanism 333 comprises a left upper connecting rod 3331 and a right upper connecting rod 3332 which are hinged to the slide block 331 respectively, a left lower connecting rod 3333 hinged between the left upper connecting rod 3331 and the pressure plate 332, a right lower connecting rod 3334 hinged between the right upper connecting rod 3332 and the pressure plate 332, a left outer connecting rod 3335 and a right outer connecting rod 3336 are also hinged to positions located on the rack 1 and at the outer sides of the slide block 331 respectively, in addition, the left outer connecting rod 3335 is hinged with the left lower connecting rod 3333, and the right outer connecting rod 3336 is hinged with the right lower connecting rod 3334.

In the bending machine, the left outer connecting rod 3335, the left upper connecting rod 3331 and the left lower connecting rod 3333 are coaxially hinged; and the right outer connecting rod 3336, the right upper connecting rod 3332 and the right lower connecting rod 3334 are coaxially hinged.

In the bending machine, when the slide block 331 moves downward, an included angle formed by the left outer connecting rod 3335 and the left upper connecting rod 3331 is gradually increased, and an included angle formed by the right outer connecting rod 3336 and the right upper connecting rod 3332 is gradually increased.

In the bending machine, the bending mechanism 4 comprises a bending part 41 arranged on the rack 1 and located at one side of the pressing mechanism 3, and the rack 1 is provided with a driving part 42 driving the bending part 41 to move up and down as well as left and right relative to the clamping mechanism 3.

In the bending machine, the bending part 41 comprises a bending knife 411 capable of pushing a workpiece 100 to be bent when moving up and down, the driving part 42 comprises a crank-connecting rod mechanism which is arranged on the rack 1 and is capable of driving the bending part 41 to move up and down, the crank-connecting rod mechanism comprises a crank 421/cranks 421 capable of rotating relative to the rack 1, a connecting rod 422/connecting rods 422 hinged between the crank 421/the cranks 421 and the bending knife 411 respectively, the rack 1 is also connected with a block 423 capable of moving up and down relative to the rack 1, the block 423 is provided with at least an inclined sliding rail 424, the bending knife 411 is provided with at least a sliding slot in sliding cooperation with the sliding rail 424 correspondingly, and when the crank 421 rotates/the cranks 421 rotate and the block 423 moves up and down, the bending knife 411 slides relative to the inclined sliding rail/rails 424, so that the up-and-down and left-and-right movements of the bending part 41 relative to the pressing mechanism 3 are realized.

In the bending machine, the bending knife 411 comprises a first bending edge 411a capable of pushing the workpiece 100 to be bent upward when the bending part 41 moves upward, and the bending knife 411 also comprises a second bending edge 411b capable of pushing the workpiece 100 to be bent downward when the bending part 41 moves downward.

In the bending machine, the pressure plate 332 is provided with a pressing die adjustment mechanism 34/pressing die adjustment mechanisms 34 capable of adjusting the width of the upper pressing die 32/the widths of the upper pressing dies 32 correspondingly, each upper pressing die 32 includes a plurality of modules 321 sequentially arranged and capable of sliding laterally relative to the pressure plate 332, each pressing die adjustment mechanism 34 includes a slide rest 341 capable of sliding laterally relative to the pressure plate 332, the slide rest 341 is provided with a shift fork 342 which may be clamped with the module 321 or clamped between two adjacent modules 321, and the slide rest 341 is provided with a driving assembly 343 capable of driving the shift fork 342 to be clamped with the module 321 or to be clamped between two adjacent modules 321.

In the bending machine, the shift fork 342 is hinged with the slide rest 341 correspondingly by a hinged shaft 344, the driving assembly 343 comprises a vertical strip hole 3431 formed in the slide rest 341, the shift fork 342 is provided with an inclined strip hole 3432, a lateral pushing shaft 3433 penetrates through the vertical strip hole 3431 and the inclined strip hole 3432, and the lateral pushing shaft 3433 can slide along the vertical strip hole 3431 and cooperates with the hole wall of the inclined strip hole 3432 during sliding to push the shift fork 342 to rotate relative to the slide rest 341, and the slide rest 341 is provided with a pushing member 3434 for pushing the pushing shaft 3433 to slide along the vertical strip hole 3431.

In the bending machine, the feeding mechanism 2 comprises a clamping part 21 capable of clamping a workpiece and also comprises a pushing part 22 capable of driving the clamping part 21 clamping the workpiece 100 to move forward, the pushing part 22 comprises a material moving frame 221 capable of moving back and forth relative to the rack 1, the clamping part 21 comprises an upper clamping platform 211 capable of lifting and rotating arranged on the material moving frame 221, and the material moving frame 221 is also provided with a lower clamping platform 212 capable of rotating relative to the material moving frame 221 and cooperating with the upper clamping platform 211 to clamp the workpiece 100.

Compared with the prior art, this invention has the following advantages:

1. The bending machine provided comprises a feeding mechanism, when the bending machine works, a plate to be bent is fed to where the pressing mechanism locates by the feeding mechanism and is bent by the bending mechanism, and the whole feeding and discharging operations may be automatically completed, so that the production efficiency is high, and the metal plate does not need to be hand-fed to where the bending mechanism locates, so that the labor intensity of the worker and the labor cost are reduced. In addition, the whole bending machine is also very simple and compact in structure.
2. When the bending machine works, when the slide block moves downward, two sides of the slide block push the left upper connecting rod and the right upper connecting rod hinged with the slide block, the left upper connecting rod pushes the hinged positions of the left lower connecting rod and the left outer connecting rod towards the outer side, the right upper connecting rod pushes the hinged positions of the right lower connecting rod and the right outer connecting rod towards the outer side, the left outer connecting rod and the right outer connecting rod are connected to the rigidly fixed rack, therefore, in the process of the moving outward of the junction of the left outer connecting rod and the left lower connecting rod, a force applied to the left lower connecting rod in a vertical direction is gradually increased, meanwhile, a force applied to the right lower connecting rod in the vertical direction is also gradually increased, and when the left lower connecting rod and the left outer connecting rod are approximately collinear, the right lower connecting rod and the right outer connecting rod are approximately collinear, the pressure applied to the pressure plate in the vertical direction approaches to be infinite. Therefore, a great output force applied may be output when a relative small force applied is input, and thus, a force increasing effect is achieved. Therefore, the required great output force applied may be achieved by adopting a driving part such as a lower-power motor or a hydraulic motor, the volume of machinery equipment may be reduced, energy is saved, and the bending machine is suitable for various occasions where a pressing force is required to be provided.
3. The bending part of the bending machine comprises a bending knife, the crank-connecting rod mechanism drives the bending knife to move up and down to bend the metal plate, the block also moves up and down relative to the rack while the crank-connecting rod mechanism drives the bending knife to move up and down, and the block is also provided with at least a sliding rail inclined and in sliding cooperation with the sliding slot/slots in the bending knife. Therefore, the bending knife not only moves up and down relative to the pressing mechanism, but also moves left and right relative to the pressing mechanism when the crank rotates and the block moves up and down, while the bending included angle of the metal plate may be controlled by controlling the rotating speed of the crank and the up-and-down movement speed of the block, and the metal plate may be bent in different angles by the same bending machine, so that the bending machine is very artful in design and simple in structure.
4. When the bending machine works, the slide rest is driven to slide laterally on the pressure plate, when the slide rest slides to a required position, the driving assembly drives the shift fork to move relative to the slide rest to make the shift fork to be clamped with a module or clamped between two adjacent modules, then the slide rest is driven again to slide laterally relative to the pressure plate, the shift fork may apply a lateral pushing force to the module/modules at one side of the shift fork when the slide rest slides again, so that the module is/modules are pushed to slide relative to the pressure plate, the plurality of modules may be separated, and then, the width of the required upper pressing die is changed so as to be freely adjusted. Therefore, the width of the upper pressing die composed of the remained modules is relatively small when the amount of the modules pushed by the shift fork towards the outer side is large, and the width of the upper pressing die composed of the remained modules is relatively large when the amount of the modules pushed by the shift fork towards the outer side is small. Therefore, the width of the required upper pressing die may be adjusted by virtue of the actions of the slide rest and the shift fork when the width of a workpiece needs to be changed during processing, so that the width of the upper pressing die is enabled to be adapted to the width of the workpiece in actual processing. Therefore, the bending and pressing of a plurality of edges of the metal plate may be completed by the same machinery equipment, so that the production efficiency is greatly improved.
5. The bending machine is simple in structure and high in production efficiency, the bending and pressing of the plurality of edges of a metal plate and the bending of a metal plate in different included angles are enabled to be completed by the same bending machine, so that the function is stronger, the production efficiency is greatly increased, the enterprise cost is reduced, and the bending machine is suitable for popularization and application.

DETAILED DESCRIPTION OF THE INVENTION

Figure 1:
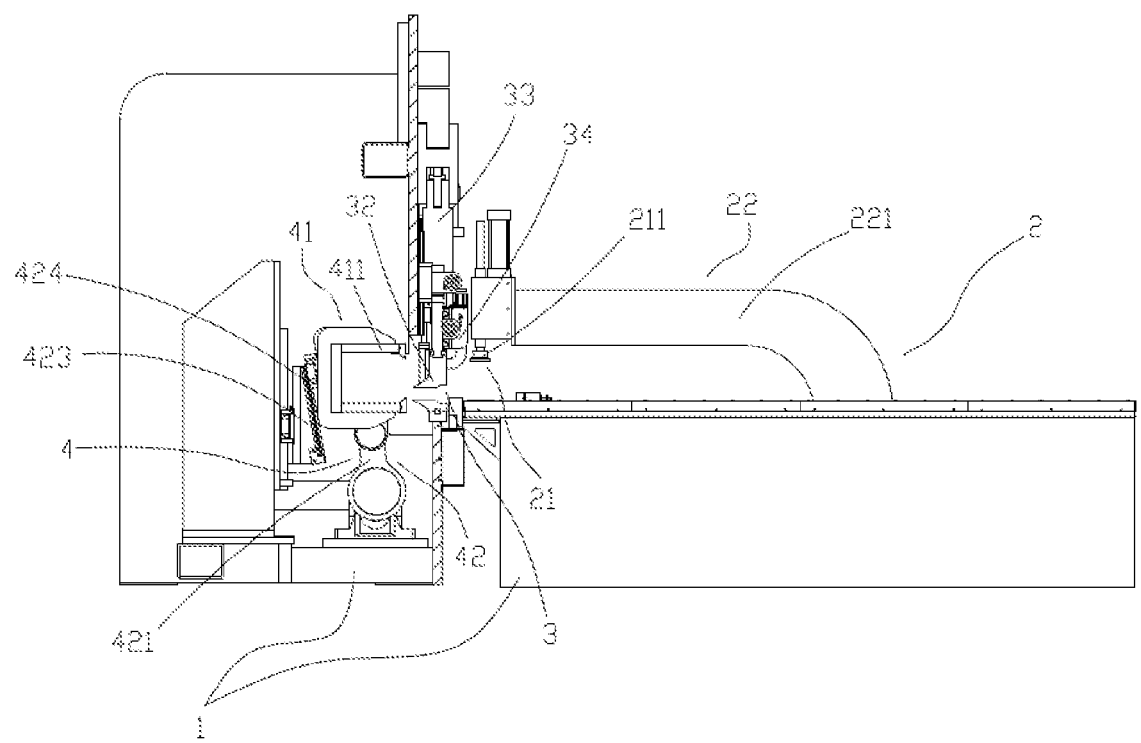
FIG. 1 is a side view of the invention.
Figure 2:
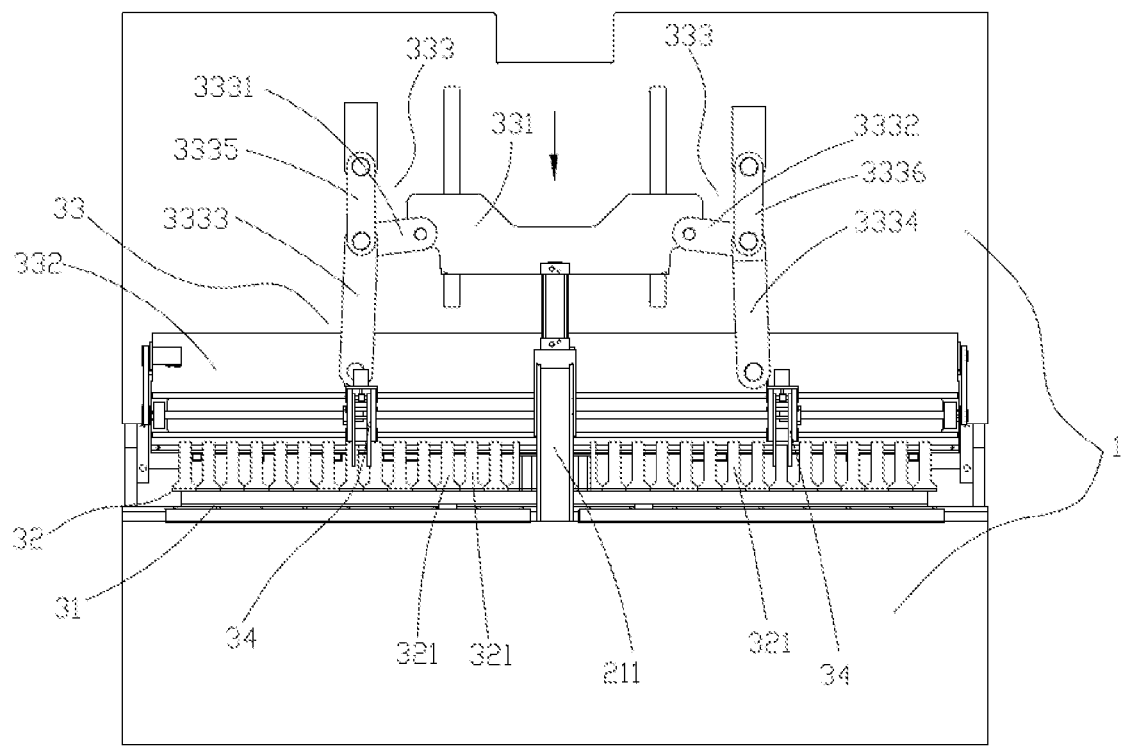
FIG. 2 is a first partial side view of the invention.

The invention is further described below in conjunction with the accompanying drawings:

As shown in FIG. 1 and FIG. 2, a bending machine comprises a rack 1, the rack 1 is provided with a feeding mechanism 2, one side of the feeding mechanism 2 is provided with a pressing mechanism 3 capable of pressing a workpiece 100 firmly, and one side of the pressing mechanism 3 is provided with a bending mechanism 4 capable of bending the workpiece 100 inside the bending mechanism 4. The bending machine provided by the invention comprises a feeding mechanism 2, when the bending machine works, a plate to be bent is fed to the position of the pressing mechanism 3 by the feeding mechanism 2 and is bent by the bending mechanism 4, the whole feeding and discharging operations may be automatically completed, so that the production efficiency is high, and it is not needed that the metal plate is manually held to be fed to the position of the bending mechanism, so that the labor intensity of a worker and the labor cost are reduced. In addition, the whole bending machine is also very simple and compact in structure.

Figure 5:
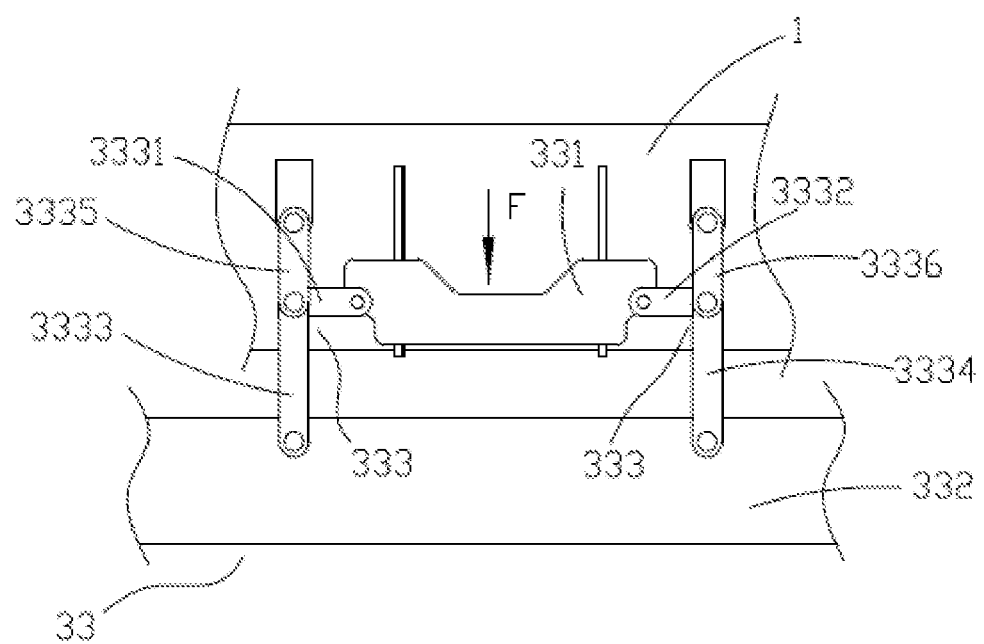
FIG. 5 is a second partial side view of the invention.
Figure 6:
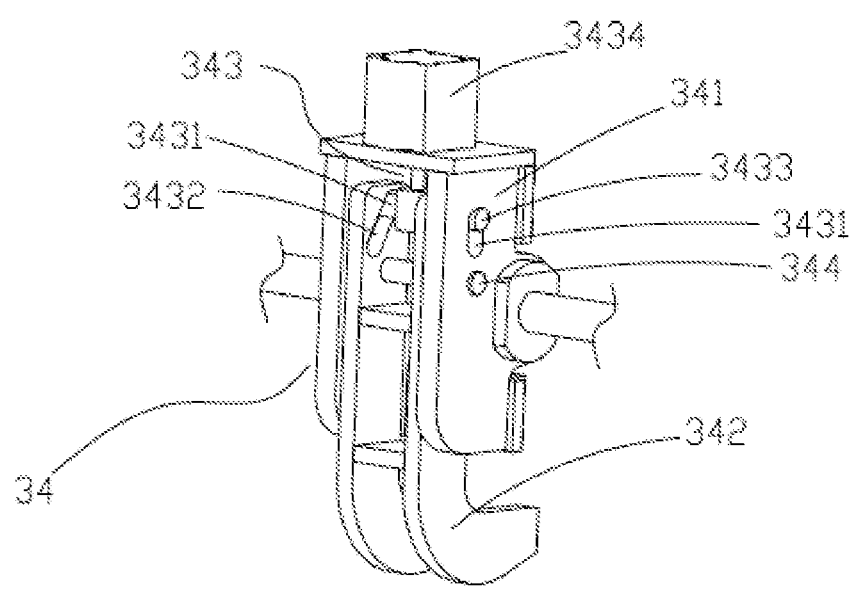
FIG. 6 is a perspective view of a pressing die adjustment mechanism of the invention.
Figure 7:
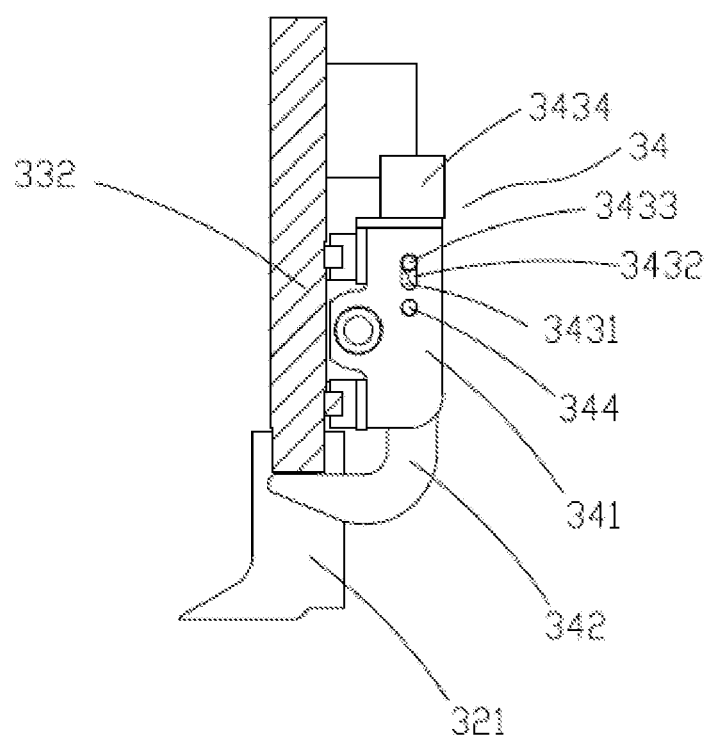
FIG. 7 is a first sectional view of the pressing die adjustment mechanism of the invention.
Figure 8:
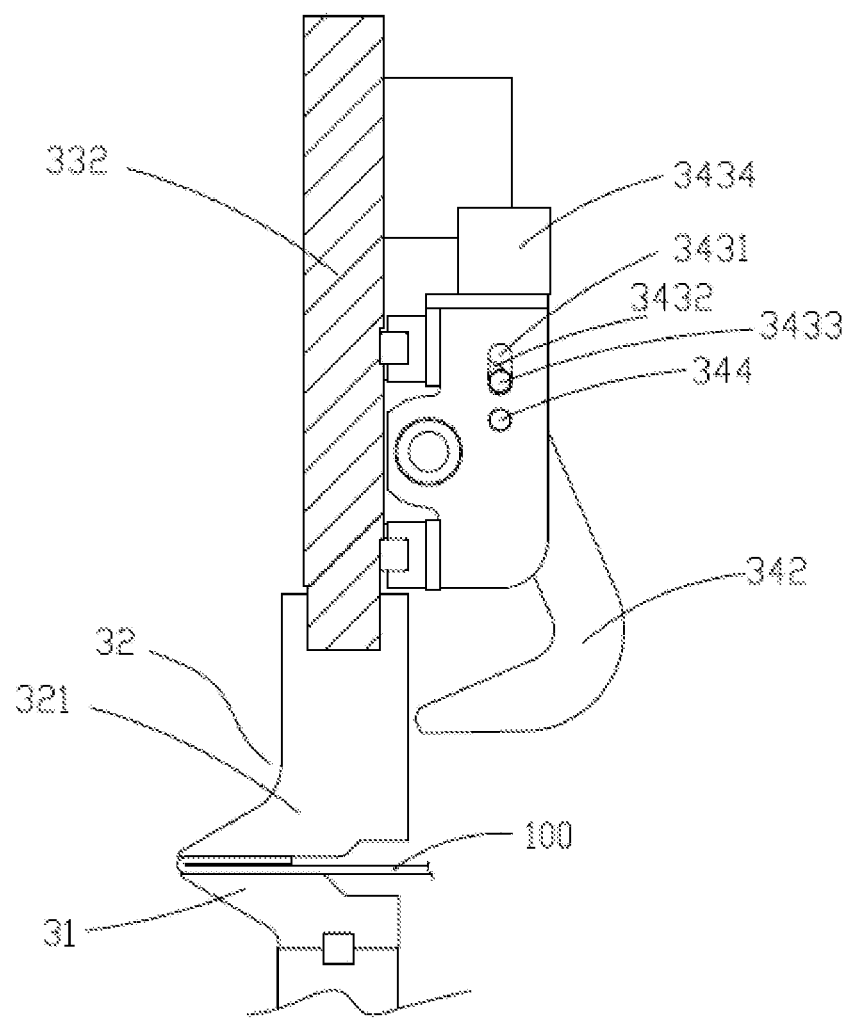
FIG. 8 is a second sectional view of the pressing die adjustment mechanism of the invention.
Figure 9:
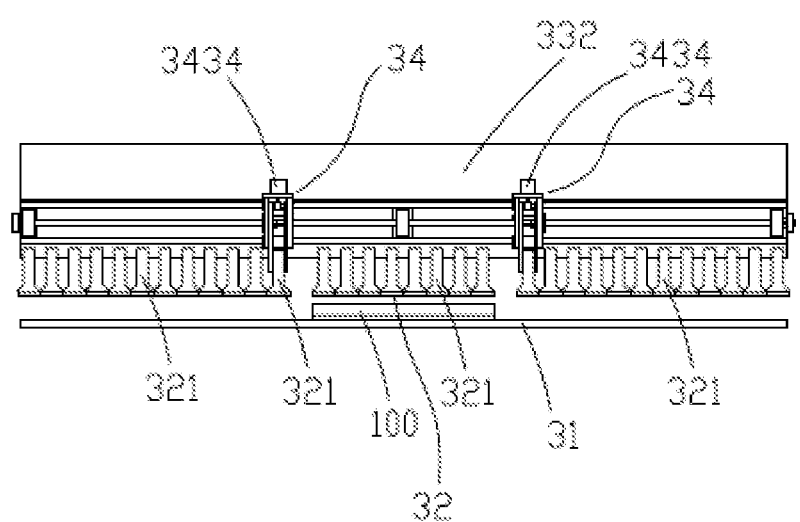
FIG. 9 is a side view of the pressing die adjustment mechanism of the invention.

As shown in FIG. 1, FIG. 2 and FIG. 5, the pressing mechanism 3 comprises at least a lower die table 31 arranged on the rack 1, at least an upper pressing die 32 is arranged above the lower die table 31, the rack 1 is provided with an upper pressing die driving mechanism 33 driving the upper pressing die 32 to ascend and descend relative to the rack 1, the upper pressing die driving mechanism 33 comprises a slide block 331 capable of sliding up and down relative to the rack 1, a pressure plate 332 is arranged below the slide block 331, the upper pressing die 32 is connected to the pressure plate 332, a first connecting rod mechanism 333 driving the pressure plate 332 to move up and down when the slide block 331 moves up and down is arranged between the slide block 331 and the pressure plate 332, the first connecting rod mechanism 333 comprises a left upper connecting rod 3331 and a right upper connecting rod 3332 which are hinged to the slide block 331 respectively, a left lower connecting rod 3333 hinged between the left upper connecting rod 3331 and the pressure plate 332, a right lower connecting rod 3334 hinged between the right upper connecting rod 3332 and the pressure plate 332, a left outer connecting rod 3335 and a right outer connecting rod 3336 are also hinged to positions located on the rack 1 and at the outer sides of the slide block 331 respectively, in addition, the left outer connecting rod 3335 is hinged with the left lower connecting rod 3333, and the right outer connecting rod 3336 is hinged with the right lower connecting rod 3334.

As shown in FIG. 2 and FIG. 5, the left outer connecting rod 3335, the left upper connecting rod 3331 and the left lower connecting rod 3333 are coaxially hinged; and the right outer connecting rod 3336, the right upper connecting rod 3332 and the right lower connecting rod 3334 are coaxially hinged.

As shown in FIG. 2 and FIG. 5, when the slide block 331 moves downward, an included angle formed by the left outer connecting rod 3335 and the left upper connecting rod 3331 is gradually increased, and an included angle formed by the right outer connecting rod 3336 and the right upper connecting rod 3332 is gradually increased.

As shown in FIG. 2 and FIG. 5, in a process that the slide block 331 moves downward, two sides of the slide block 331 push the left upper connecting rod 3331 and the right upper connecting rod 3332 hinged with the slide block, the left upper connecting rod 3331 pushes the articulated parts of the left lower connecting rod 3333 and the left outer connecting rod 3335 towards the outer side, the right upper connecting rod 3332 pushes the articulated parts of the right lower connecting rod 3334 and the right outer connecting rod 3336 towards the outer side, the left outer connecting rod 3335 and the right outer connecting rod 3335 are connected to the rigidly fixed rack 1, therefore, in a moving outward of the junction of the left outer connecting rod 3335 and the left lower connecting rod 3333, a force applied to the left lower connecting rod 3333 in a vertical direction is gradually increased, meanwhile, a force applied to the right lower connecting rod 3334 in the vertical direction is also gradually increased, and when the left lower connecting rod 3333 and the left outer connecting rod 3335 are approximately collinear, and the right lower connecting rod 3334 and the right outer connecting rod 3336 are approximately colinear, the pressure applied to the pressure plate 332 in the vertical direction approaches to be infinite Therefore, a great output force applied may be output when a relative small force applied is input, and thus, a force increasing effect is achieved. Therefore, the required great output force applied may be achieved by adopting a driving part such as a lower-power motor or a hydraulic motor, the volume of machinery equipment may be reduced, the energy is saved, and the bending machine is suitable for various occasions where a pressing force is required to be provided.

Figure 3:
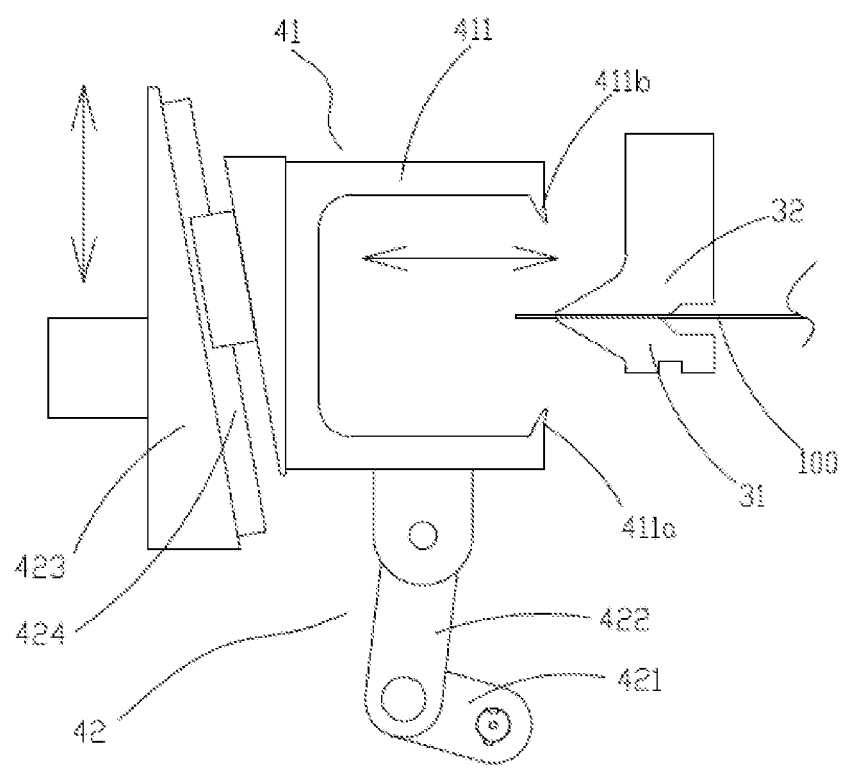
FIG. 3 is a first schematic diagram of the bending mechanism of the invention.
Figure 4:
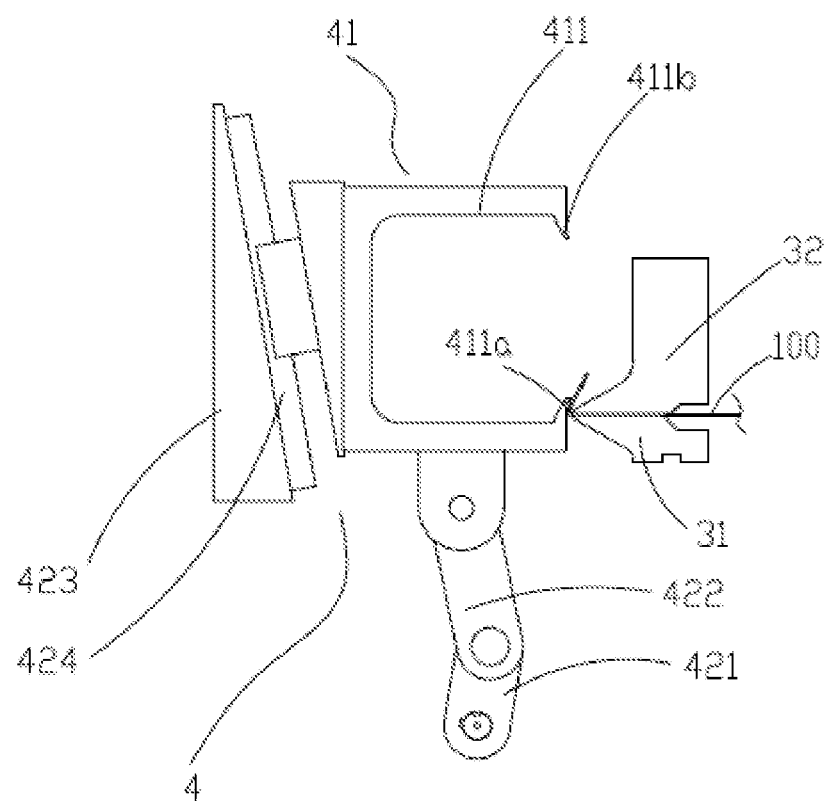
FIG. 4 is a second schematic diagram of the bending mechanism of the invention.

As shown in FIG. 1, FIG. 3 and FIG. 4, the bending mechanism 4 comprises a bending part 41 disposed on the rack 1 and located at one side of the pressing mechanism 3, and the rack 1 is provided with a driving part 42 driving the bending part 41 to move up and down as well as left and right relative to the pressing mechanism 3.

As shown in FIG. 1, FIG. 3 and FIG. 4, the bending part 41 comprises a bending knife 411 capable of pushing a workpiece 100 to be bent when moving up and down, the driving part 42 comprises a crank-connecting rod mechanism disposed on the rack 1 and capable of driving the bending part 41 to move up and down, the crank-connecting rod mechanism includes a crank 421 capable of rotating relative to the rack 1, a connecting rod 422 hinged between the crank 421 and the bending knife 411, the rack 1 is also connected with a block 423 capable of moving up and down relative to the rack 1, the block 423 is provided with at least one inclined sliding rail 424, the bending knife 411 is provided with at least a sliding slot in sliding cooperation with the sliding rail 424, and when the crank 421 rotates and the block 423 moves up and down, the bending knife 411 slides relative to the inclined sliding rail 424, so that the up-and-down and left-and-right movements of the bending part 41 relative to the pressing mechanism 3 are realized.

Figure 11:
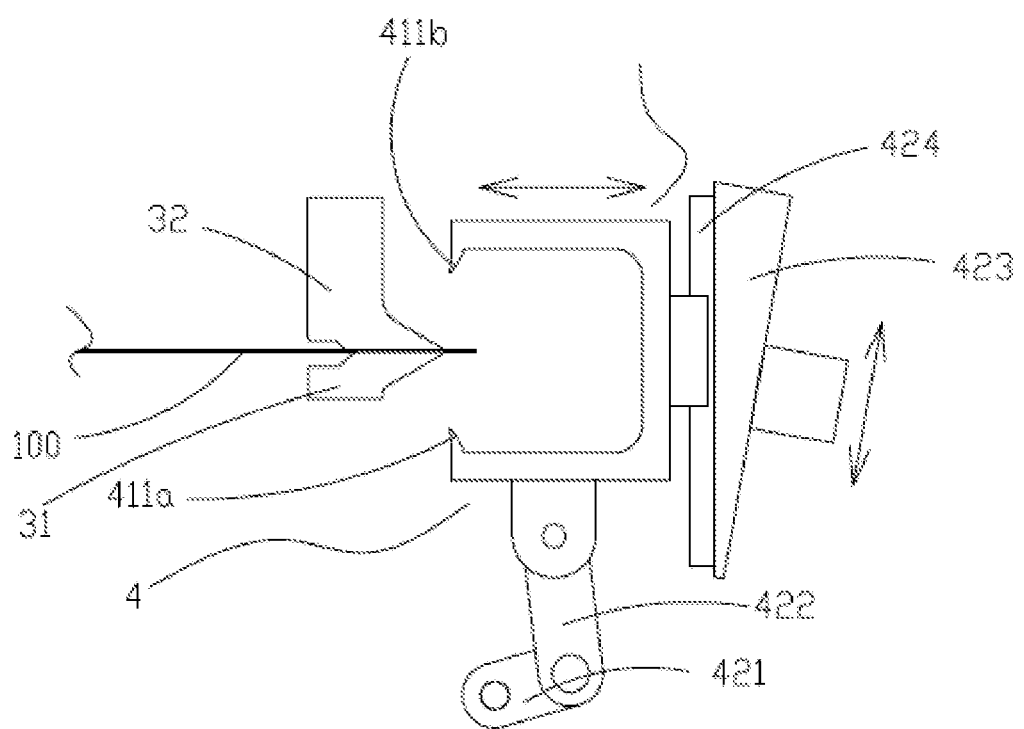
FIG. 11 is a schematic view of another embodiment of the bending mechanism of the invention.

As shown in FIG. 3 and FIG. 4, the crank-connecting rod mechanism drives the bending knife 411 to move up and down to bend the metal plate, the block 423 also moves up and down relative to the rack 1 while the crank-connecting rod mechanism drives the bending knife 411 to move up and down, and the block 423 is also provided with at least on sliding rail 424 which is inclined and is in sliding cooperation with the sliding slot in the bending knife 411. Therefore, the bending knife 411 not only moves up and down relative to the pressing mechanism 3, but also moves left and right relative to the pressing mechanism 3 when the crank 421 rotates and the block 423 moves up and down, while the bending included angle of the metal plate may be controlled by controlling the rotating speed of the crank 421 and the up-and-down movement speed of the block 423, and the metal plate may be bent in different angles by the same bending machine, so that the bending machine is very artful in design and simple in structure. Of course, as shown in FIG. 11, the block 423 may also obliquely move relative to the rack 1, the sliding rail 424 is vertically arranged in the embodiment, therefore, the bending knife 411 not only moves up and down relative to the pressing mechanism 3, but also moves left and right relative to the pressing mechanism 3 when the crank 421 rotates and the block 423 obliquely moves, while the bending included angle of the metal plate may be controlled by controlling the rotating speed of the crank 421 and the oblique movement speed of the block 423.

As shown in FIG. 3 and FIG. 4, the bending knife 411 comprises a first bending edge 411a capable of pushing a workpiece 100 to be bent upward when the bending part 41 moves upward, and the bending knife 411 also comprises a second bending edge 411b capable of pushing the workpiece 100 to be bent downward when the bending part 41 moves downward.

As shown in FIG. 1, FIG. 2, FIG. 6, FIG. 7, FIG. 8 and FIG. 9, the pressure plate 332 is provided with a pressing die adjustment mechanism 34/pressing die adjustment mechanisms 34 capable of adjusting the width of the upper pressing die 32, the upper pressing die 32 comprises a plurality of modules 321 sequentially arranged and capable of sliding laterally relative to the pressure plate 332, each pressing die adjustment mechanism 34 comprises a slide rest 341 capable of sliding laterally relative to the pressure plate 332, the slide rest 341 is provided with a shift fork 342 which may be clamped with a module 321 or may be clamped between two adjacent modules 321, and the slide rest 341 is provided with a driving assembly 343 which may drive the shift fork 342 to be clamped with the module 321 or to be clamped between two adjacent modules 321.

As shown in FIG. 6 to FIG. 9, when the pressing die adjustment mechanism 34 works, the slide rest 341 is driven to slide laterally relative to the pressure plate 332, when the slide rest 341 slides to a required position, the driving assembly 343 drives the shift fork 342 to move relative to the slide rest 341 to make the shift fork 342 be clamped with a module 321 or clamped between two adjacent modules 321, next, the slide rest 341 is driven again to slide laterally relative to the pressure plate 332, the shift fork 342 may apply a lateral pushing force to the module/modules 321 at one side of the shift fork 342 in the second sliding of the slide rest 341, so that the module/modules 321 are pushed to slide relative to the pressure plate 332, the plurality of modules 321 may be separated, and then, the width of the required upper pressing die 32 is changed so as to be freely adjusted. Therefore, the width of the pressing die composed of the remained module/modules is relatively small when the amount of the modules 321 pushed by the shift fork 342 towards the outer side is large, and the width of the pressing die composed of the remained modules 321 is relatively large when the amount of the module/modules 321 pushed by the shift fork 342 towards the outer side is small. Therefore, the width of the required pressing die may be adjusted by virtue of the actions of the slide rest 341 and the shift fork 342 when the width of a workpiece 100 is changed during processing, so that the width of the pressing die is enabled to be adapted to the width of the workpiece in actual processing. Therefore, the bending and pressing of a plurality of edges of the metal plate may be completed by the same machinery equipment, so that the production efficiency is greatly increased.

Figure 12:
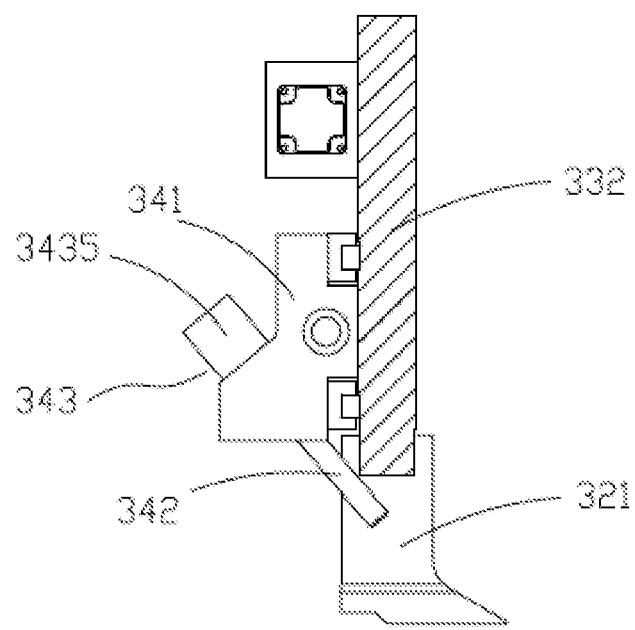
FIG. 12 is a schematic view of another embodiment of pressing die adjustment mechanism of the invention.

As shown in FIG. 6 to FIG. 9, the shift fork 342 is hinged with the slide rest 341 by a hinged shaft 344 correspondingly, the driving assembly 343 comprises a vertical strip hole 3431 formed in the slide rest 341, the shift fork 342 is provided with an inclined strip hole 3432, a lateral pushing shaft 3433 penetrates through the vertical strip hole 3431 and the inclined strip hole 3432, and the lateral pushing shaft 3433 slides along the vertical strip hole 3431 during sliding and cooperates with the hole wall of the inclined strip hole 3432 to push the shift fork 342 to rotate relative to the slide rest 341, and the slide rest 341 is provided with a pushing member 3434 for pushing the pushing shaft 3433 to slide along the vertical strip hole 3431. In a process that the pushing member 3434 pushes the pushing shaft 3433, the pushing shaft 3433 slides along the vertical strip hole 3431, and meanwhile, the pushing shaft 3433 is cooperated with the wall of the inclined strip hole 3432 to apply a pushing force to the shift fork 342, so that the shift fork 342 rotates relative to the slide rest 341 by virtue of the hinged shaft 344. Therefore, the shift fork 342 rotates to a position where the shift fork 342 is clamped with a module 321 or a position between two adjacent modules 321 when a module 321 needs/the modules 321 need to be shifted to one side by the shift fork 342; and the shift fork 342 rotates to a position where the shift fork 342 is separated from the module/modules 321 when the workpiece 100 needs to be pressed by the upper pressing die 32, but the width of the upper pressing die 32 does not need to be adjusted by the shift fork 342. The whole structure is artful in design and is also very simple. Of course, as shown in FIG. 12, the shift fork 342 may be clamped with a module 321 or clamped between two adjacent modules 321 by the following structure: the shift fork 342 is slidably connected with the slide rest 341 correspondingly and is obliquely arranged, the driving assembly 343 comprises a driving cylinder 3435 arranged on the slide rest 341 and capable of driving the shift fork 342 to obliquely slide relative to the slide rest 341, so as to be clamped with the module 321 or clamped between two adjacent modules 321. When the width of the upper pressing die 32 needs to be adjusted, the driving cylinder 3435 drives the shift fork 342 to obliquely slide to be clamped with a module 321 or clamped between every two adjacent module 321, then, the slide rest 341 slides laterally, and therefore, the bending machine is simple and reliable in whole structure and stable in operation.

Figure 10:
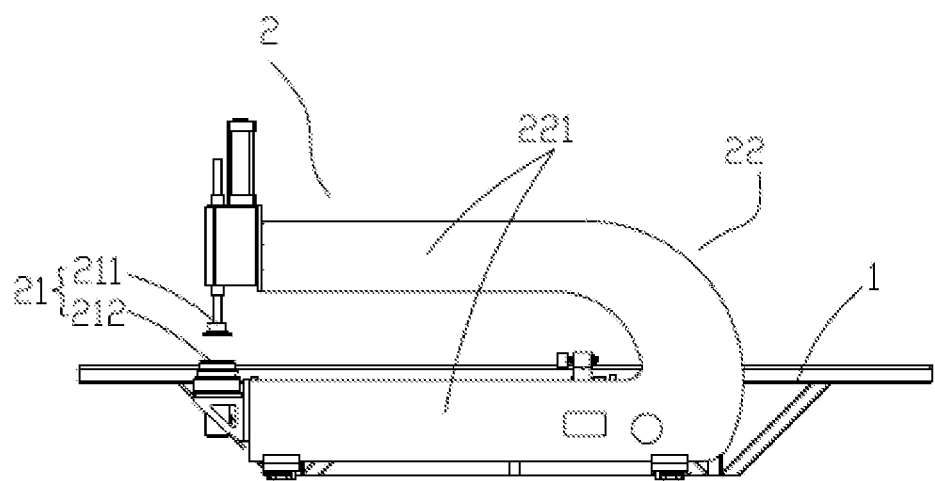
FIG. 10 is a side view of the feeding mechanism of the invention.

As shown in FIG. 1 and FIG. 10, the feeding mechanism 2 comprises a clamping part 21 capable of clamping a workpiece and also comprises a pushing part 22 capable of driving the clamping part 21 clamping the workpiece 100 to move forward, the pushing part 22 comprises a material moving frame 221 capable of moving back and forth relative to the rack 1, the clamping part 21 comprises an upper clamping platform 211 arranged on the material moving frame 221 and capable of lifting and rotating, and the material moving frame 221 is also provided with a lower clamping platform 212 capable of rotating relative to the material moving frame 221 and cooperated with the upper clamping platform 211 to clamp the workpiece 100. When feeding is needed, a workpiece 100 is placed on the feeding mechanism 2, the upper clamping platform 211 moves downward and cooperates with the lower clamping platform 212 to clamp the workpiece 100, the material moving frame 221 moves forward to feed the workpiece 100 to the position of the pressing mechanism 3, and when the bending of one edge of the workpiece 100 is completed, the material moving frame 221 is retreated, and the workpiece 100 is rotated with the rotation of the upper clamping platform 211 and the lower clamping platform 212, and then, the material moving frame 221 transfers materials forward again, so that the bending and pressing of all edges of the workpiece 100 are completed.

What is claimed is:

1. A bending machine, comprising:
a rack, the rack being provided with a feeding mechanism, one side of the feeding mechanism is provided with a pressing mechanism configured to press a workpiece, and one side of the pressing mechanism is provided with a bending mechanism configured to bend the workpiece inside the bending mechanism,
wherein the pressing mechanism comprises a lower die table arranged on the rack, an upper pressing die is arranged above the lower die table, the rack is provided with an upper pressing die driving mechanism driving the upper pressing die to ascend and descend relative to the rack, the upper pressing die driving mechanism comprises a slide block configured to slide up and down relative to the rack, a pressure plate is arranged below the slide block, the upper pressing die is connected to the pressure plate, a first connecting rod mechanism driving the pressure plate to move up and down when the slide block moves up and down is arranged between the slide block and the pressure plate, the first connecting rod mechanism comprises a left upper connecting rod and a right upper connecting rod which are hinged to the slide block respectively, a left lower connecting rod hinged between the left upper connecting rod and the pressure plate, a right lower connecting rod hinged between the right upper connecting rod and the pressure plate, a left outer connecting rod and a right outer connecting rod are also hinged to positions located on the rack and at an outer side of the slide block respectively, in addition, the left outer connecting rod is hinged with the left lower connecting rod, and the right outer connecting rod is hinged with the right lower connecting rod,
the pressure plate is provided with a pressing die adjustment mechanism configured to adjust a width of the upper pressing die, the upper pressing die includes a plurality of modules sequentially arranged and configured to slide laterally relative to the pressure plate, each pressing die adjustment mechanism includes a slide rest configured to slide laterally relative to the pressure plate, the slide rest is provided with a shift fork which is configured to be clamped with a module of the plurality of modules or clamped between two adjacent modules of the plurality of modules, and the slide rest is provided with a driving assembly configured to drive the shift fork to be clamped with the module or to be clamped between the two adjacent modules, and
the shift fork is hinged with the slide rest by a hinged shaft, the driving assembly comprises a vertical strip hole formed in the slide rest, the shift fork is provided with an inclined strip hole, a lateral pushing shaft penetrates through the vertical strip hole and the inclined strip hole, and the lateral pushing shaft can slide along the vertical strip hole and cooperates with a hole wall of the inclined strip hole during sliding to push the shift fork to rotate relative to the slide rest, and the slide rest is provided with a pushing member for pushing the pushing shaft to slide along the vertical strip hole.

2. The bending machine according to claim 1, wherein the left outer connecting rod, the left upper connecting rod and the left lower connecting rod are coaxially hinged; and the right outer connecting rod, the right upper connecting rod and the right lower connecting rod are coaxially hinged.

3. The bending machine according to claim 2, wherein when the slide block moves downward, an included angle formed by the left outer connecting rod and the left upper connecting rod is gradually increased, and an included angle formed by the right outer connecting rod and the right upper connecting rod is gradually increased.

4. The bending machine according to claim 1, wherein the bending mechanism comprises a bending part arranged on the rack and located at one side of the pressing mechanism, and the rack is provided with a driving part driving the bending part to move up and down as well as left and right relative to the pressing mechanism.

5. The bending machine according to claim 4, wherein the bending part comprises a bending knife configured to push a workpiece to be bent when moving up and down, the driving part comprises a crank-connecting rod mechanism which is arranged on the rack and is configured to drive the bending part to move up and down, the crank-connecting rod mechanism comprises a crank configured to rotate relative to the rack, a connecting rod hinged between the crank and the bending knife respectively, the rack is also connected with a block configured to move up and down relative to the rack, the block is provided with an inclined sliding rail, the bending knife is provided with a sliding slot in sliding cooperation with the inclined sliding rail, and when the crank rotates and the block moves up and down, the bending knife slides relative to the inclined sliding rail, so that the up-and-down and left-and-right movements of the bending part relative to the pressing mechanism are realized.

6. The bending machine according to claim 5, wherein the bending knife comprises a first bending edge configured to push the workpiece to be bent upward when the bending part moves upward, and the bending knife also comprises a second bending edge configured to push the workpiece to be bent downward when the bending part moves downward.

7. The bending machine according to claim 1, wherein the feeding mechanism comprises a clamping part configured to clamp the workpiece and also comprises a pushing part configured to drive the clamping part to move forward, the pushing part comprises a material moving frame configured to move back and forth relative to the rack, the clamping part comprises an upper clamping platform configured to lift and rotate arranged on the material moving frame, and the material moving frame is also provided with a lower clamping platform configured to rotate relative to the material moving frame and cooperating with the upper clamping platform to clamp the workpiece.

\* \* \* \* \*